(12) United States Patent
Glickman et al.

(10) Patent No.: US 11,872,907 B2
(45) Date of Patent: Jan. 16, 2024

(54) STRUCTURAL BATTERY AND HEADLAMP COOLING

(71) Applicant: Ford Global Technologies, LLC, Dearborn, MI (US)

(72) Inventors: David Brian Glickman, Southfield, MI (US); Sean Terence Coghlan, Canton, MI (US); James Alan Acre, Monroe, MI (US); Darshan Arun Nayak, Northville, MI (US); Stuart C. Salter, White Lake, MI (US); Zeljko Deljevic, Plymouth, MI (US); David A. Brown, Plymouth, MI (US); Alan George Dry, Grosse Pointe Woods, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 623 days.

(21) Appl. No.: 17/075,997

(22) Filed: Oct. 21, 2020

(65) Prior Publication Data
US 2022/0118881 A1    Apr. 21, 2022

(51) Int. Cl.
*B60L 58/26* (2019.01)
*H01M 10/613* (2014.01)
*F21S 45/43* (2018.01)
*F21S 45/47* (2018.01)
*F21S 45/49* (2018.01)

(52) U.S. Cl.
CPC ............... *B60L 58/26* (2019.02); *F21S 45/43* (2018.01); *F21S 45/47* (2018.01); *F21S 45/49* (2018.01); *H01M 10/613* (2015.04); *B60L 2240/36* (2013.01); *H01M 2220/20* (2013.01)

(58) Field of Classification Search
CPC ............ H01M 2200/20; H01M 10/613; B60L 2240/36; B60L 58/26; F21S 45/47; F21S 45/49; F21S 45/43
USPC ....................................................... 180/68.2
See application file for complete search history.

(56) References Cited

U.S. PATENT DOCUMENTS

| | | | |
|---|---|---|---|
| 5,320,190 A * | 6/1994 | Naumann | H01M 10/6566 180/68.5 |
| 6,871,697 B2 * | 3/2005 | Albright | F01P 11/029 165/41 |

(Continued)

FOREIGN PATENT DOCUMENTS

| | | |
|---|---|---|
| FR | 2601907 B1 | 2/1991 |
| KR | 20140020655 A | 2/2014 |

*Primary Examiner* — James A Shriver, II
*Assistant Examiner* — Hilary L Johns
(74) *Attorney, Agent, or Firm* — Vichit Chea; Carlson, Gaskey & Olds, P.C.

(57) ABSTRACT

A front end structure of a vehicle is disclosed and includes a housing having a fluid reservoir portion, a fan shroud portion, a back face, a bolster portion, a first air passage communicating airflow to an air intake system, and a second air passage in communication with a higher pressure airflow. A fan assembly is mounted within the fan shroud portion and a radiator mounted to the back face of the housing. A battery compartment is in communication with airflow from the second air passage for maintain battery temperature within a predefined range. A headlight also receives an airflow to actively remove moisture from an inner cavity. A method of assembling a front end structure is also disclosed.

19 Claims, 8 Drawing Sheets

(56) References Cited

U.S. PATENT DOCUMENTS

| | | | |
|---|---|---|---|
| 8,701,811 B2* | 4/2014 | Robinson | B60K 1/04 |
| | | | 180/68.5 |
| 9,228,556 B2* | 1/2016 | Koenen | H02J 7/0013 |
| 9,694,668 B1* | 7/2017 | Yun | B60K 11/06 |
| 9,902,254 B1* | 2/2018 | Long | B60K 11/04 |
| 10,012,186 B2* | 7/2018 | Roten | F02M 35/10209 |
| 11,014,440 B2* | 5/2021 | Glickman | B60K 11/04 |
| 11,161,390 B2* | 11/2021 | Sakane | B60H 1/00849 |
| 11,591,028 B2* | 2/2023 | Menez Sánchez | B62D 25/085 |
| 2011/0051452 A1* | 3/2011 | Shih | F21S 41/663 |
| | | | 362/546 |
| 2013/0284530 A1* | 10/2013 | Robinson | B60K 11/06 |
| | | | 180/68.5 |
| 2014/0014426 A1* | 1/2014 | Lauper, Jr. | F01P 11/10 |
| | | | 180/68.1 |
| 2016/0001629 A1* | 1/2016 | Rohr | B60K 11/04 |
| | | | 165/76 |
| 2018/0022209 A1* | 1/2018 | Shiheiber | B60K 11/06 |
| | | | 165/288 |
| 2019/0092118 A1* | 3/2019 | Lee | B60L 1/003 |
| 2020/0052355 A1* | 2/2020 | Kosteva | H01M 10/625 |
| 2020/0254845 A1* | 8/2020 | Miura | B60H 1/32281 |

* cited by examiner

STRUCTURAL BATTERY AND HEADLAMP COOLING

TECHNICAL FIELD

This disclosure relates to a front end structure for a motor vehicle including a fan disposed between a radiator and a condenser within an integrated module.

BACKGROUND

The front end structure of a motor vehicles supports components such as a bolster, radiator, condenser, air induction components, latch assemblies, batteries and headlights.

SUMMARY

An front end structure of a vehicle according to an exemplary aspect of the present disclosure includes, among other possible things, a housing including a fluid reservoir portion, a fan shroud portion, a back face, a bolster portion, a first air passage communicating airflow to an air intake system, and a second air passage in communication with a higher pressure airflow, a fan assembly mounted within the fan shroud portion, a radiator mounted to the back face and a battery compartment in communication with the second air passage.

In a further non-limiting embodiment of the foregoing front end structure, the battery compartment includes a battery air inlet in airflow communication with the second air passage and a battery air outlet to communicate the higher pressure airflow through the battery compartment.

In a further non-limiting embodiment of any of the foregoing front end structures, a flow actuator is included for controlling a flow of the higher pressure airflow into the battery compartment.

In a further non-limiting embodiment of any of the foregoing front end structures, including a fan for selectively drawing air through the battery compartment.

In a further non-limiting embodiment of any of the foregoing front end structures, including a headlight with a headlight air passage in communication with the second air passage.

In a further non-limiting embodiment of any of the foregoing front end structures, the headlight air passage is a space disposed between an inner wall and an outer wall, wherein the inner wall surrounds an inner cavity with lighting elements disposed therein.

In a further non-limiting embodiment of any of the foregoing front end structures, the inner wall includes a moisture permeable portion that moisture from within the inner cavity to pass into the headlight air passage.

In a further non-limiting embodiment of any of the foregoing front end structures, a plurality of ribs are disposed between the inner wall and the outer wall, the plurality of ribs directing airflow through the headlight air passage.

In a further non-limiting embodiment of any of the foregoing front end structures, the headlight air passage vents airflow through a filter element disposed at a headlight air passage outlet.

In a further non-limiting embodiment of any of the foregoing front end structures, a portion of the headlight air passage is in thermal communication with the radiator for heating airflow through the headlight air passage.

In a further non-limiting embodiment of any of the foregoing front end structures, the radiator includes a hot water riser in thermal communication with the headlight air passage.

A front end structure of a vehicle according to another exemplary aspect of the present disclosure includes, among other possible things, a bolster and fluid assembly including a housing including a fluid reservoir portion, a fan shroud portion, a back face, a bolster portion, a first air passage communicating airflow to an air intake system, and a high pressure air passage in communication with a higher pressure airflow, a fan assembly mounted within the fan shroud portion and a radiator mounted to the back face and a lighting and power assembly including a battery disposed within a battery compartment and a headlight assembly, wherein both the battery compartment and the headlight assembly are in airflow communication with the high pressure air passage.

A further non-limiting embodiment of the foregoing front end structure includes a flow actuator for controlling airflow through the battery compartment and a fan for selectively drawing air through the battery compartment.

In a further non-limiting embodiment of any of the foregoing front end structures, the headlight includes lighting elements within an inner cavity, an inner wall partially surrounding the inner cavity, an outer wall spaced apart from the inner wall and a headlight air passage defined within a space between then inner wall and the outer wall.

In a further non-limiting embodiment of any of the foregoing front end structures, the inner wall is at least partially moisture permeable for drawing moisture from within the inner cavity into the headlight air passage.

In a further non-limiting embodiment of any of the foregoing front end structures, a portion of the headlight air passage is in thermal communication with a portion of the radiator for heating airflow through the headlight air passage.

A method of assembling a vehicle lighting and power assembly according to another exemplary aspect of the present disclosure includes, among other possible things, providing an airflow passage from a high pressure air source to an inlet of a battery compartment, providing a controller programmed to determine a temperature outside the vehicle and a temperature of the battery, providing the controller with instructions to operate an actuator close the airflow passage to airflow in response to the temperature outside the vehicle and the temperature of the battery being within a first predefined temperature range and providing the controller with instructions to operate the actuator to open the airflow passage to airflow and starting a fan to draw airflow through the airflow passage in response to the temperature outside the vehicle and the battery temperature being within a second predefined temperature range.

A further non-limiting aspect of the foregoing method includes providing a passage for directing a portion of air from the high pressure air source through a headlight air passage to draw moisture from an inner cavity of the headlight into an airflow through the headlight air passage.

A further non-limiting aspect of the foregoing method includes providing an airflow passage to place a portion of the high pressure airflow into thermal contact with a heat source to warm the airflow before directing the airflow through the headlight air passage.

A further non-limiting aspect of the foregoing method includes assembling a moisture permeable portion of a wall of the inner cavity to provide removal of moisture from the inner cavity of the headlight assembly.

The various features and advantages of this disclosure will become apparent to those skilled in the art from the following detailed description. The drawings that accompany the detailed description can be briefly described as follows.

DETAILED DESCRIPTION

Figure 1:
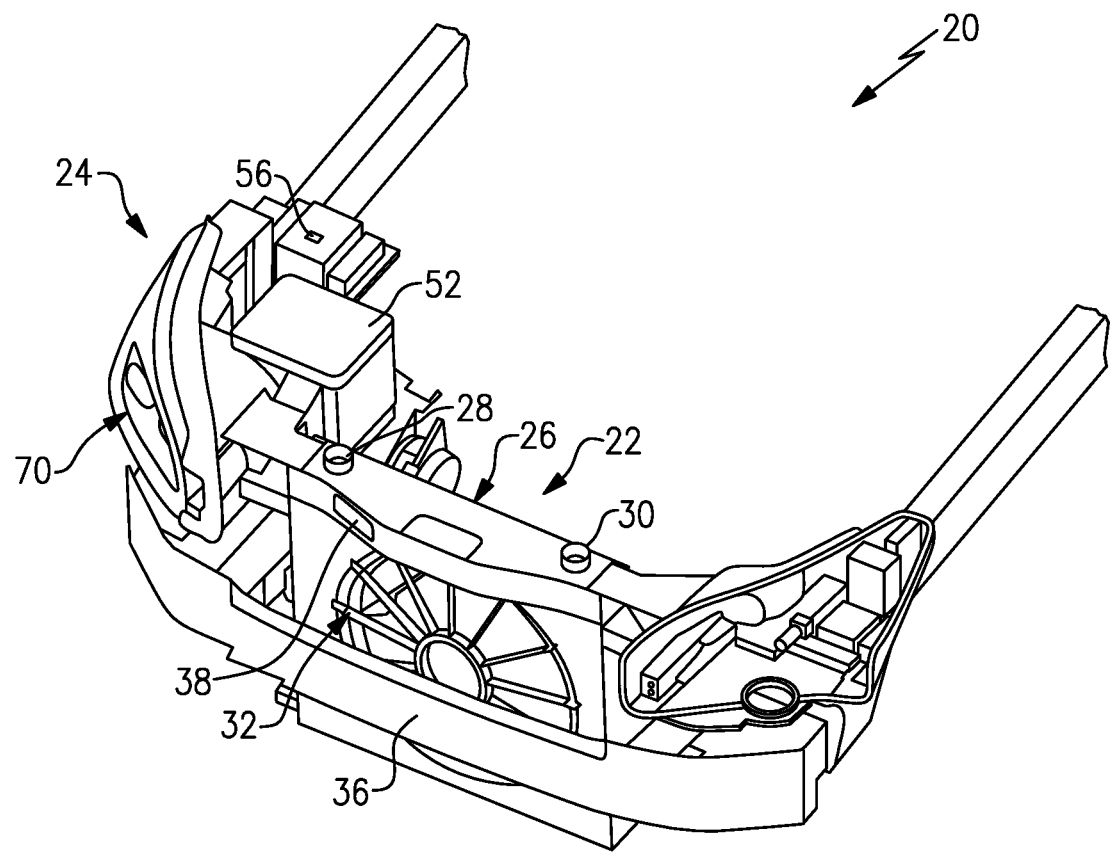
FIG. 1 is a perspective view of an example front end structure of a motor vehicle.

Referring to FIG. 1, an example front end structure 20 for a vehicle is shown and includes a bolster/fluid assembly 22 and a light/power assembly 24. The bolster/fluid assembly 22 includes a housing 26 with a fluid reservoir 28, a degas reservoir 30 and a first passage 38 for intake air. A bolster 36 is provided car forward of the housing 26 and provides structure to the front end assembly 20. The light/power assembly 24 includes a battery compartment 52, power distribution box 56 and headlights 70.

The example front end structure 20 includes integrated features for providing airflow to the example battery compartment 52 to provide temperature control of the battery compartment 52. Temperature control of the battery compartment 52 provides for use of a lighter, smaller and more efficient battery such as for example a Lithium-Ion battery. Moreover, the example front end structure 20 further includes features for routing airflow through the headlights 70 to remove moisture and prevent fogging of the headlights 70.

Figure 2:
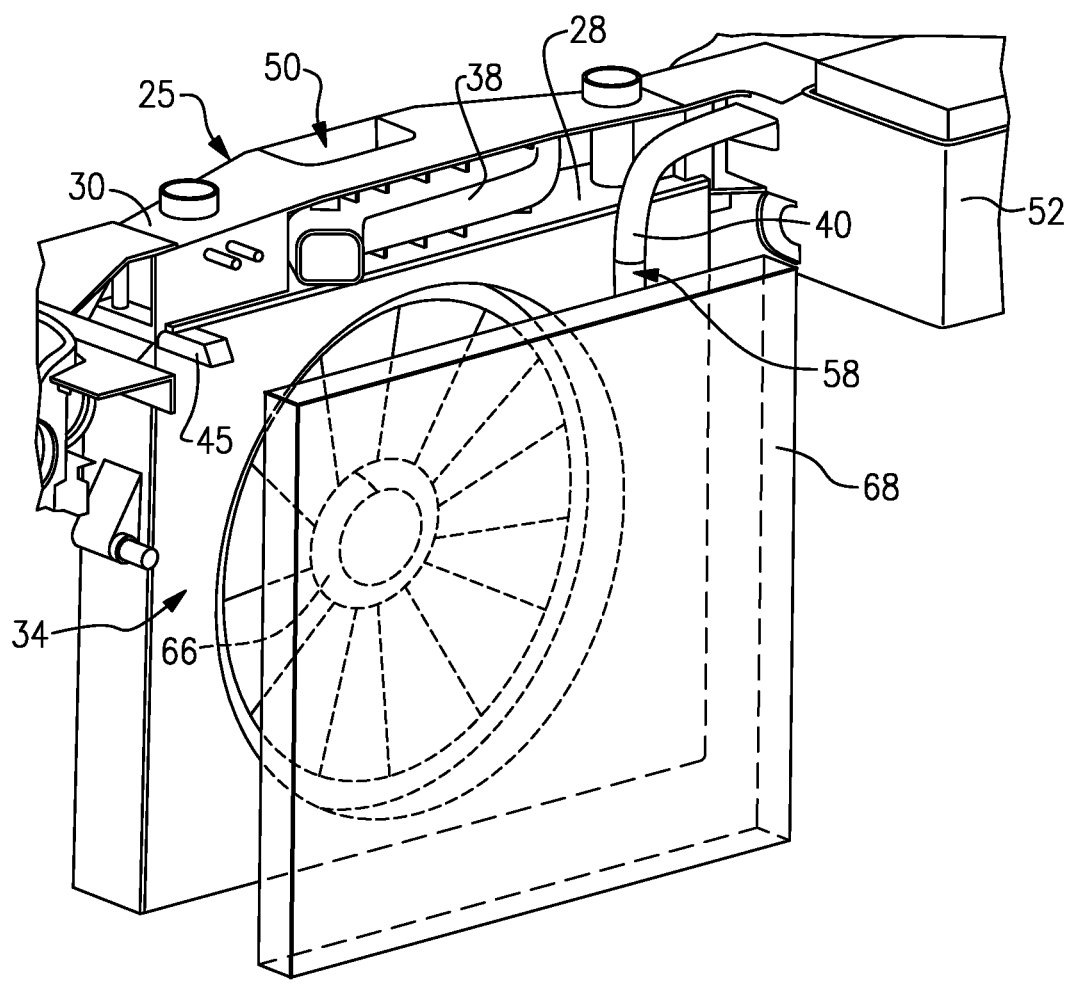
FIG. 2 is a perspective view of a portion of a back side of the front end structure.

Referring to FIG. 2 with continued reference to FIG. 1, a back face 34 of the housing 26 provides a mounting location for a fan assembly 66 that is mounted within a fan shroud 32 defined by the housing 26. A radiator 68, shown schematically, is also mounted either to the housing 26 or proximate the housing 26 to provide coolant to the vehicle engine. The housing 26 includes a top portion 25 within which is the fluid reservoir 28 and the degas reservoir 30. The first passage 38 is show within the top portion 25 and provides a path for air that is provided to the engine air intake system (not shown). The top portion 25 further includes a cavity 50 for a hood latch. The features of the top portion 25 of the housing 26 are integrated in to a single unitary structure.

The housing 26 may be formed from a molded plastic material using injection molding and/or additive manufacturing processes. Moreover, although the example housing 26 is shown as a single unitary structure, it within the contemplation of this disclosure that the features of the housing 26 constructed separately and assembled or attached.

The housing 26 includes second air passages 40, 45 for communicating airflow to the battery compartment 52 and the headlights 70. In this example, one side of the housing 26 is shown with the second air passage 40 for the battery compartment 52 and the headlights 70. The second air passage 45 is provided to communicate airflow to the other headlight 70.

The example second air passage 40 includes an inlet 58 that is in communication with a high pressure source of airflow. In this example, the inlet 58 is an opening on the back face 34 of the housing 26. Air entering the inlet 58 is communicated into the battery compartment 52.

Figure 3:
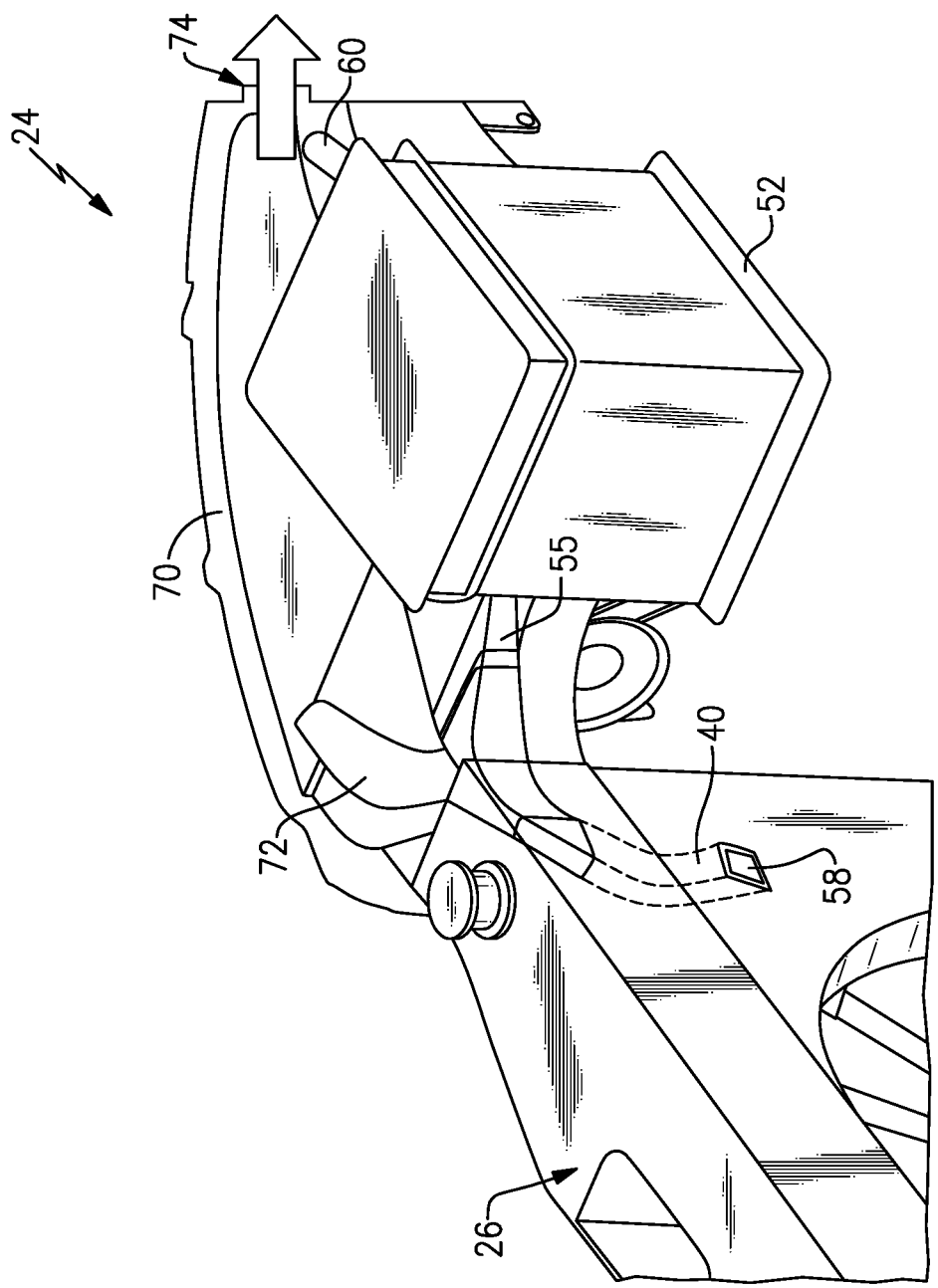
FIG. 3 is a perspective view of a portion of a battery compartment of the front end structure.
Figure 4:
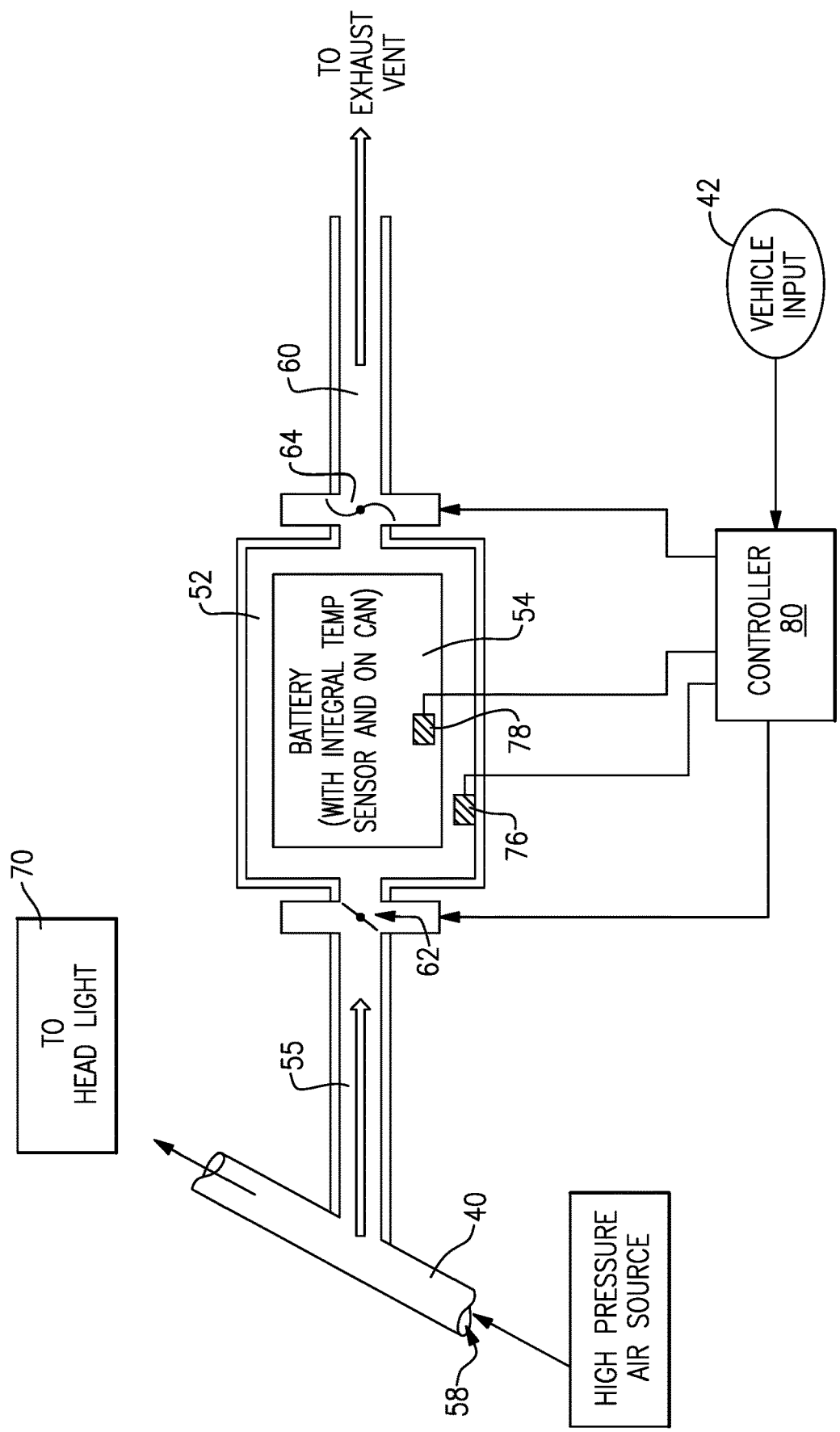
FIG. 4 is a schematic view of an example battery compartment embodiment.

Referring to FIGS. 3 and 4, the second air passage 40 includes the inlet 58 through the housing 26 on the back face 34. The passage 40 extends through the housing 26 to a battery inlet passage 55 (shown schematically in FIG. 4). The passage 55 is in communication with the passage 40 through the housing 26. In this example, the passage 40 is also in communication to provide airflow to the headlight 70 on the same side of the vehicle as the battery compartment 52.

The example battery compartment 52 supports a battery 54 and includes space for airflow around the battery 54 and through the compartment 52. The example battery 54 is a Lithium-Ion battery 54 that operates within a defined temperature range. The example battery compartment 52 includes features for maintaining the compartment 52 and the battery within the defined temperature range. An actuator 62 is provided in the passage 55 to control airflow entering the battery compartment 52. A fan 64 is provided at an outlet 60 to aid in moving airflow through the battery compartment 52 in the absence of airflow, such as when the vehicle is not moving. The actuator 62 and fan 64 are shown schematically and may be placed in alternate locations than those illustrated in the disclosed example.

A compartment temperature sensor 76 is in communication with a controller 80. A battery temperature sensor 78 is also in communication with the controller 80. The controller 80 utilizes information from the temperature sensors 76, 78 and from the vehicle indicated at 42 to control operation of the actuator 62 and the fan 64. The example controller 80 may be part of the vehicle controller and/or a separate controller for the light/power assembly 24.

Figure 5:
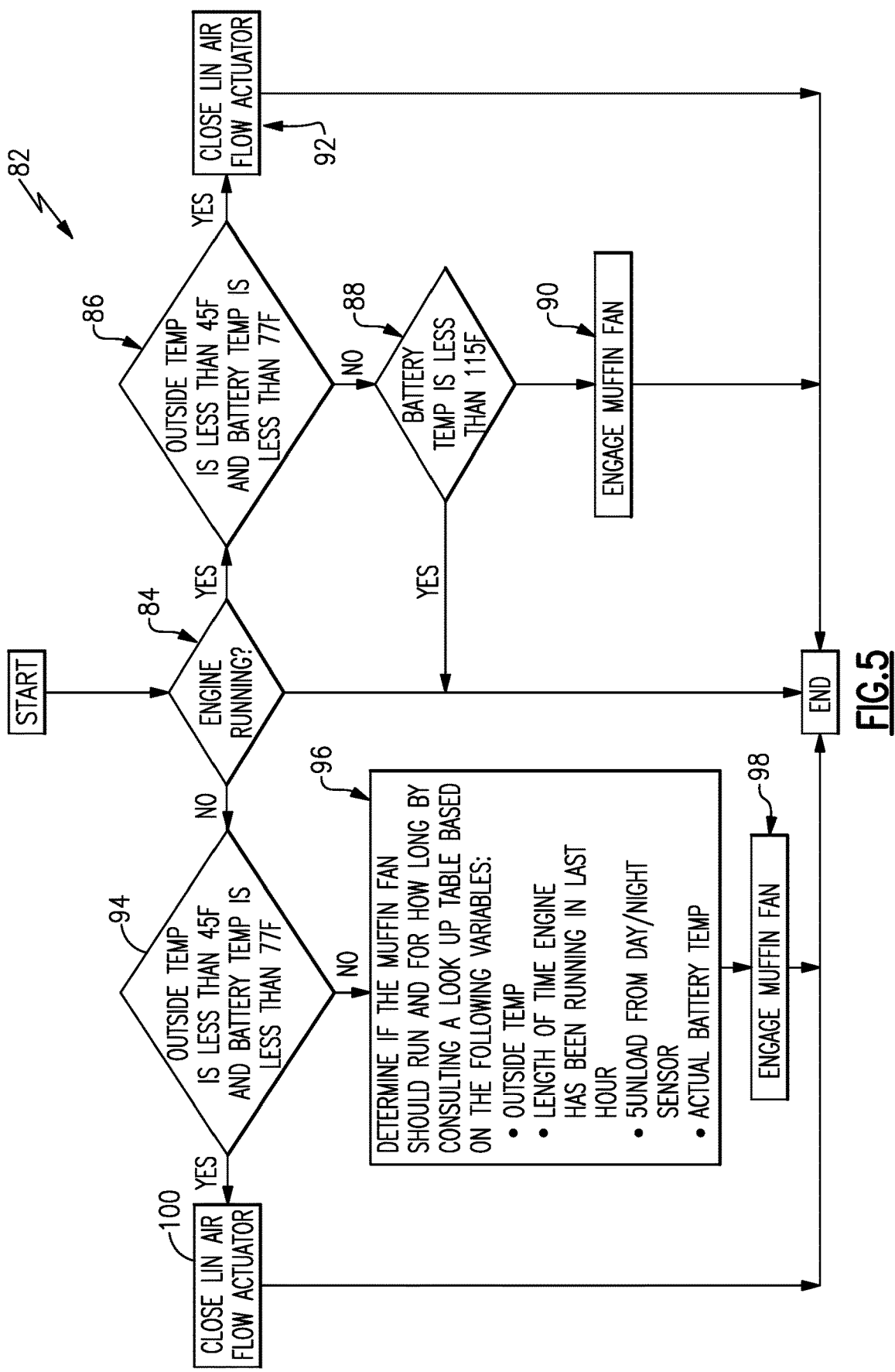
FIG. 5 is a flow diagram of an example mode of operation of the example battery compartment.

Referring to FIG. 5 with continued reference to FIG. 4, an example method of operation of the battery compartment 52 is schematically shown as a process flow diagram 82. The controller 80 uses information from the temperature sensors 76, 78 and vehicle input 42 to coordinate actuation of the actuator 62 and the fan 64.

In an initial step of operation, the controller 80 determines if the engine is running, or not as shown at 84. If the engine is running, the controller 80 reviews temperatures both inside the battery compartment 52 and outside the vehicle as indicated at 86. The outside temperature is provided by a vehicle temperature sensor located elsewhere within the vehicle. If the outside temperature is below a predefined value combined with an actual temperature of the battery that is within predefined parameters, the actuator 62 is closed as indicated at 92. In this example, the predefined parameters include an outside temperature below 45° F. and a battery temperature that is less than about 77° F. Because the battery 54 operates within a defined and narrow temperature range, cooler temperatures may warrant that cooling airflow be stopped to keep the battery 54 within the desired temperature range.

A further query is performed if the battery temperature is above the temperature determined during the first step 86. The further query schematically indicated at 88 sets another higher temperature value for the battery 54. If the battery is above the temperature limit set out in step 86 but still below the temperature value set out in 88, then the actuator 62 is not actuated and airflow is allowed into the battery compartment 52. In this example, the temperature value is 115° F. It should be understood that the temperature values are provided by way of an example disclosure and other temperature values may be utilized based on vehicle configuration, environment, battery type and desired operation. Moreover, the temperature values may vary depending on vehicle environment and operation.

If the battery temperature is above the value set out in step 88, the fan 64 may be actuated as indicated at 90. Temperatures above a certain value prompt actuation of the fan 90 in the absence of vehicle movement to assure adequate airflow through the battery compartment 52 to cool and maintain predefined operating temperature of the battery 54. The controller 80 continually monitors temperatures and adjusts operation of the fan 64 and the actuator accordingly. Once the temperature of the battery 54 is within the predefined range, the controller will turn off the fan 64 and either open or close the actuator 62 as appropriate.

If the initial step of operation 84 indicates that the engine is running another mode of operation is performed. The temperature of the battery 54 and exterior temperature are determined as indicated at 94 in the same way as this inquiry was conducted if the engine were not running. However, given that the engine is running and an airflow is provided, different actions are performed.

As indicated at 96, if the temperature is not within the defined range at step 94, then the controller 80 with selectively actuate the actuator 62 and/or the fan 64 as indicated at 98 to adjust a temperature of the battery 54. If the temperature is higher than desired, than the controller 80 will determine if airflow from movement of the vehicle is sufficient to cool the battery 54. If the airflow is determined not to be sufficient, then the controller 80 will actuate the fan 64 to increase air flow through the battery compartment 52 to cool the battery 54. If the temperature is lower than desired, than the controller 80 will determine if the actuator should be closed 62 to prevent airflow as indicated at 100 and allow the battery 54 to warm up. The actions by the controller 80 to govern operation of the fan 64 and actuator 62 also consider other operating factors outside of the battery compartment 52.

For example, engine operating condition, external temperature, sun load, and the duration that the engine has been running. It should be appreciated, that the above operational parameters are provided as examples and that other vehicle operating parameters may be considered by the controller 80 to operate the actuator 62 and fan 64 to maintain battery temperature within a predefined range. Accordingly, the example battery compartment 52 and controller 80 operates to maintain the battery 54 within a predefined operating temperature range. Control of the battery compartment 52 temperature provides for the use of smaller, lighter and more efficient battery types such as the disclosed example Lithium-Ion battery 54.

Figure 6:
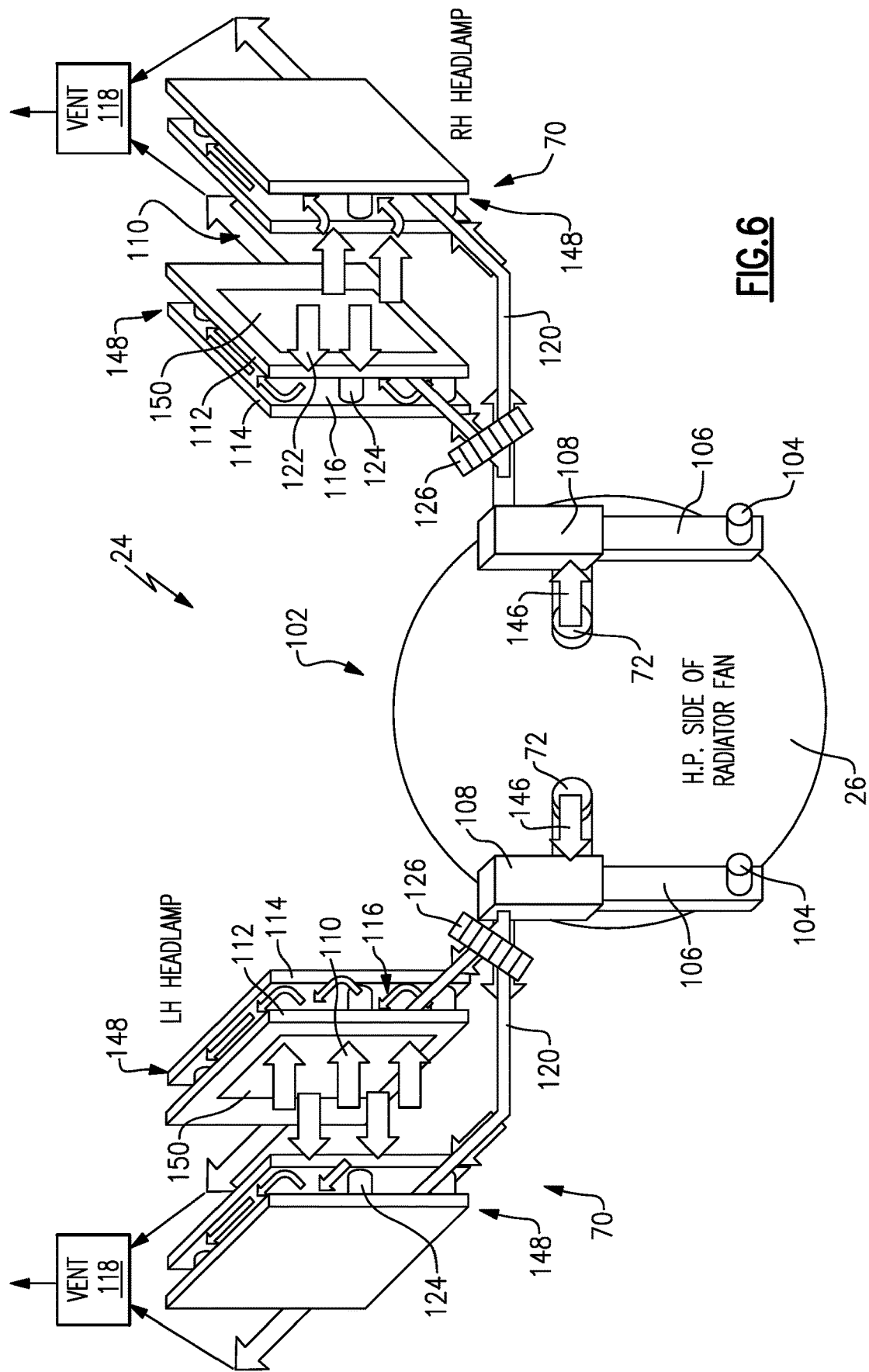
FIG. 6 is a schematic view of an example headlight assembly embodiment.
Figure 7:
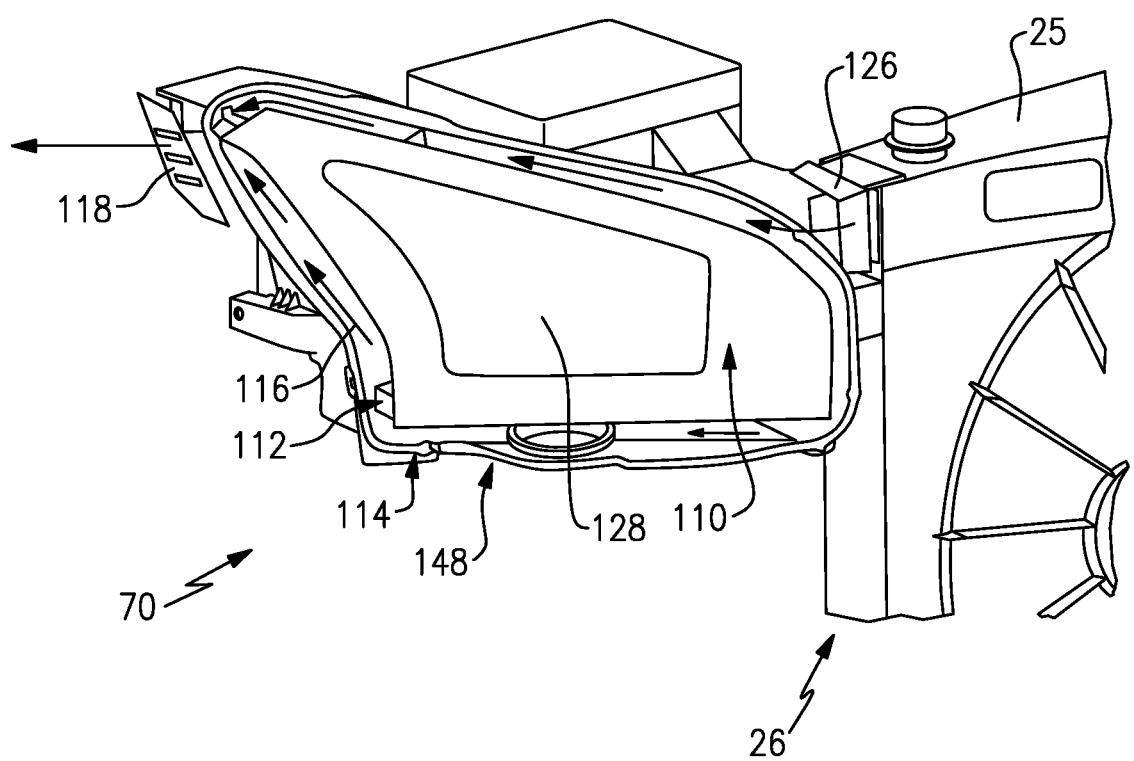
FIG. 7 is a perspective view of an example headlight assembly.

Referring to FIGS. 6 and 7, an example embodiment of the light/power assembly 24 is schematically shown and includes headlights 70 that are in airflow communication with air directed through a housing assembly 102. The housing assembly 102 is shown schematically and includes a housing 26 that define air passages to provide air flow to each of the headlights 70. Airflow through the headlights 70 remove moisture to prevent accumulation and fogging.

In this disclosed example, high pressure air flow 146 is communicated into inlets 72 to a heat exchanger 108. The heat exchanger 108 is in thermal communication by way of duct 106 with warm coolant flowing through inlets 104. In this example, there is a heat exchanger 108 and duct 106 for each of the two headlights 70. However, one heat exchanger 108 and duct 106 could be utilized for both headlights 70. High pressure airflow 146 is warmed in the heat exchanger and directed into each of the headlights 70.

Each of the headlights 70 include an inner cavity 110 with the lighting devices and electronics schematically indicated at 128 (FIG. 7). The inner cavity 110 is bounded by a wall assembly 148 shown schematically in FIG. 6. The wall assembly 148 is shaped according to the desired shape of the headlight 70. The wall assembly 148 includes an inner wall 112 spaced apart from an outer wall 114. An air passage 116 is disposed in the space between the inner wall 112 and the outer wall 114. The air passage 116 receives the heated airflow 120 that flows through the headlight and exhausted out a vent 118. In one example, the heated airflow 120 is passed through an air filter 126 prior to flowing into the passage 116.

The inner wall 112 includes a selectively permeable portion 150. The selectively permeable portion 150 may be small patches, or most of the inner wall 112. In this example the selective permeable portion 150 is schematically shown as a portion of the inner wall 112. The permeable portions 150 allow moisture from within the inner cavity 110 to desorb through the inner wall 112 as shown by arrows 122, but does not allow moisture to move from the passage 116 into the cavity 110. Airflow within the passage 116 creates a pressure that draws moisture from within the inner cavity 110 into the passage 116 and vents that moisture out through a vent 118. The vent 118 is also a selectively permeable element that allows one way passage of moisture out of the inner cavity 110.

In this example, ribs 124 are provided between the inner wall 112 and the outer wall 114 to provide support and to induce turbulence in the warm airflow 144 to improve thermal efficiency. The rigs 124 may further be orientated to direct airflow to specific locations against the inner wall 112 to further improve evacuation of moisture.

In one example embodiment, the walls 148 of the headlight 70 are formed utilizing additive manufacturing processes. Although additive manufacturing is disclosed by way of example, other manufacturing forming processes could be utilized and are within the contemplation of this disclosure.

Figure 8:
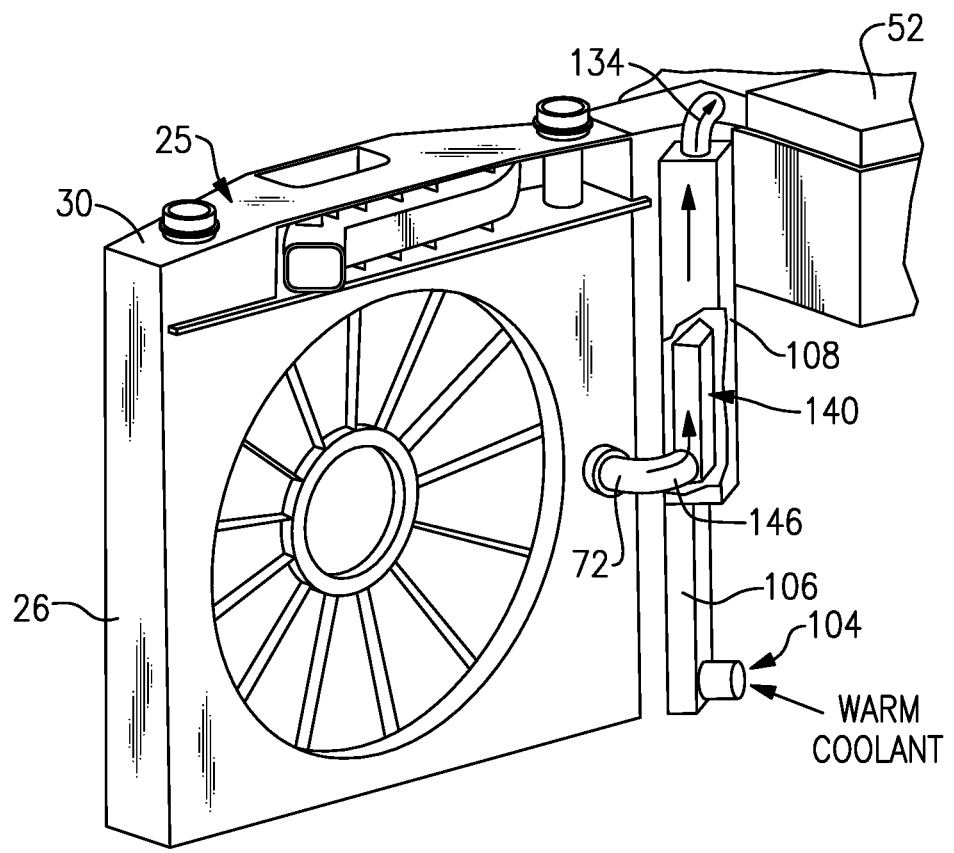
FIG. 8 is a perspective view of a back portion of an example front end structured according to another example embodiment.

Referring to FIG. 8 with continued reference to FIGS. 6 and 7, a portion another heat exchanger 108 is shown in a partial sectional view to show the interface 140 of the duct 106. High pressure air 146 from the inlet 72 is communicated into the heat exchanger 108. The duct 106 extends into the heat exchanger 108 at the interface 140. The interface 140 is the portion of the duct 106 in direct thermal communication with the airflow 146. The air accepts heat from the warm coolant supplied through the duct 106 and warm air 120 flows into the corresponding headlight 70 (FIGS. 6 and 7). Accordingly, the headlights 70 include and active moisture removal airflow that draws moisture away from the lighting elements 128.

Accordingly, the example front end module 20 include features that provide for the use of lighter and more efficient batteries along with an active moisture removal from the head lights in an integrated module.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A front end structure of a vehicle comprising:
    a housing including a fluid reservoir portion, a fan shroud portion, a back face, a bolster portion, a first air passage communicating airflow to an air intake system, and a second air passage in communication with a higher pressure airflow;
    a fan assembly mounted within the fan shroud portion;
    a radiator mounted to the back face; and
    a battery compartment in communication with the second air passage, wherein the battery compartment includes a battery air inlet in airflow communication with the second air passage and a battery air outlet to communicate the higher pressure airflow through the battery compartment; and
    a headlight air passage in communication with the second air passage.

2. The front end structure as recited in claim 1, further comprising a flow actuator for controlling a flow of the higher pressure airflow into the battery compartment.

3. The front end structure as recited in claim 2, further comprising a fan for selectively drawing air through the battery compartment.

4. The front end structure as recited in claim 1, further comprising a headlight disposed within the headlight air passage.

5. The front end structure as recited in claim 1, wherein the headlight air passage is a space disposed between an inner wall and an outer wall, wherein the inner wall surrounds an inner cavity with lighting elements disposed therein.

6. The front end structure as recited in claim 5, wherein the inner wall includes a moisture permeable portion that moisture from within the inner cavity to pass into the headlight air passage.

7. The front end structure as recited in claim 6, further comprising a plurality of ribs disposed between the inner wall and the outer wall, the plurality of ribs directing airflow through the headlight air passage.

8. The front end structure as recited in claim 6, wherein the headlight air passage vents airflow through a filter element disposed at a headlight air passage outlet.

9. The front end structure as recited in claim 5, wherein a portion of the headlight air passage is in thermal communication with the radiator for heating airflow through the headlight air passage.

10. The front end structure as recited in claim 8, wherein the radiator includes a hot water riser in thermal communication with the headlight air passage.

11. A front end structure of a vehicle, the front end structure comprising:
    a bolster and fluid assembly including a housing including a fluid reservoir portion, a fan shroud portion, a back face, a bolster portion, a first air passage communicating airflow to an air intake system, and a high pressure air passage in communication with a higher pressure airflow, a fan assembly mounted within the fan shroud portion and a radiator mounted to the back face; and
    a lighting and power assembly including a battery disposed within a battery compartment and a headlight assembly, wherein both the battery compartment and the headlight assembly are in airflow communication with the high pressure air passage.

12. The front end structure of a vehicle as recited in claim 11, further comprising a flow actuator for controlling airflow through the battery compartment and a fan for selectively drawing air through the battery compartment.

13. The front end structure of a vehicle as recited in claim 11, wherein the headlight includes lighting elements within an inner cavity, an inner wall partially surrounding the inner cavity, an outer wall spaced apart from the inner wall and a headlight air passage defined within a space between then inner wall and the outer wall.

14. The front end structure of a vehicle as recited in claim 13, wherein the inner wall is at least partially moisture permeable for drawing moisture from within the inner cavity into the headlight air passage.

15. The front end structure of a vehicle as recited in claim 14, wherein a portion of the headlight air passage is in thermal communication with a portion of the radiator for heating airflow through the headlight air passage.

16. A method of assembling a vehicle lighting and power assembly comprising:
    providing an airflow passage from a high pressure air source to an inlet of a battery compartment;
    providing a controller programmed to determine a temperature outside the vehicle and a temperature of the battery;
    providing the controller with instructions to operate an actuator close the airflow passage to airflow in response to the temperature outside the vehicle and the temperature of the battery being within a first predefined temperature range; and
    providing the controller with instructions to operate the actuator to open the airflow passage to airflow and starting a fan to draw airflow through the airflow passage in response to the temperature outside the vehicle and the battery temperature being within a second predefined temperature range.

17. The method of operating a vehicle lighting and power assembly as recited in claim 16, further comprising providing a passage for directing a portion of air from the high pressure air source through a headlight air passage to draw moisture from an inner cavity of the headlight into an airflow through the headlight air passage.

18. The method of operating a vehicle lighting and power assembly as recited in claim 17, further comprising providing an airflow passage to place a portion of the high pressure airflow into thermal contact with a heat source to warm the airflow before directing the airflow through the headlight air passage.

19. The method of operating a vehicle lighting and power assembly as recited in claim 18, further comprising assembling a moisture permeable portion of a wall of the inner cavity to provide removal of moisture from the inner cavity of the headlight assembly.

* * * * *